E. B. REQUA.
LANTERNS.

No. 194,466. Patented Aug. 21, 1877.

Witnesses:
T. C. Brecht
A. H. Norris

Inventor:
Elias Burghe Requa,
by James L. Norris
Atty.

N. PETERS, PHOTO-LITHOGRAPHER, WASHINGTON, D. C.

UNITED STATES PATENT OFFICE.

ELIAS B. REQUA, OF JERSEY CITY, NEW JERSEY.

IMPROVEMENT IN LANTERNS.

Specification forming part of Letters Patent No. 194,466, dated August 21, 1877; application filed May 5, 1877.

*To all whom it may concern:*

Be it known that I, ELIAS B. REQUA, of Jersey City, Hudson county, and State of New Jersey, have invented a new and useful Improvement in Lanterns, which improvement is fully set forth in the following specification, reference being had to the accompanying drawings.

This invention relates to certain improvements in lanterns, its object being to provide for the proper circulation of fresh air through the bottom of the same, in order to supply the flame with a uniform quantity of air without being affected by gusts and sudden movements of the lamp, and to cool the oil in the lamp, and decrease the tendency of explosions; and also to provide for the free escape of the products of combustion at the top, and obviate the tendency of the customary back-drafts, which interfere with the regularity of the flame.

To this end my invention consists, first, in the combination, with the lamp-burner, of a tubular deflector, connected with suitable draft-passages extending through the body of the lamp and terminating above the lamp-burner, whereby the air necessary for the support of combustion is carried through the body of the lamp in a uniform current, and caused to cool the oil on its way, as more fully hereinafter set forth; second, in the combination, with the lantern and its lamp, of a double bottom, having an air-space between its walls, that portion of the lamp-shell between the walls being provided with perforations to admit air to the passages communicating with the tubular deflector, whereby a uniform current of air is admitted to the lamp, as more fully hereinafter specified; third, in combination, with the double bottom of the lamp, of a series of partitions, forming air-spaces between the walls of said bottom, whereby the air is more uniformly supplied to the burner, as more fully hereinafter specified; fourth, in combination with a lamp, of a concavo-convex bottom, whereby the air is deflected into the space above the false bottom, and supplied to the lamp in a uniform current, as more fully hereinafter set forth; fifth, in a tubular deflector, in combination with the double bottom of the lamp, whereby the air is prevented from entering in gusts, and is uniformly supplied to the burners, substantially as set forth; sixth, in the combination of the lamp, tubular deflector, and concavo-convex bottom, with the band, cap, and air-spaces at the top of the lantern, whereby an increased supply of air is admitted to the lantern when shifted vertically, as set forth.

Figure 1:
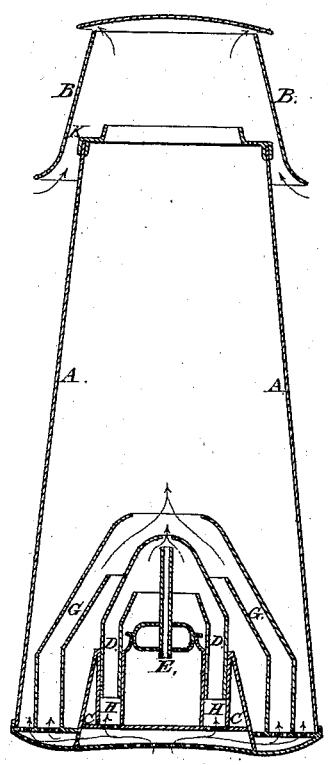
Figure 2:
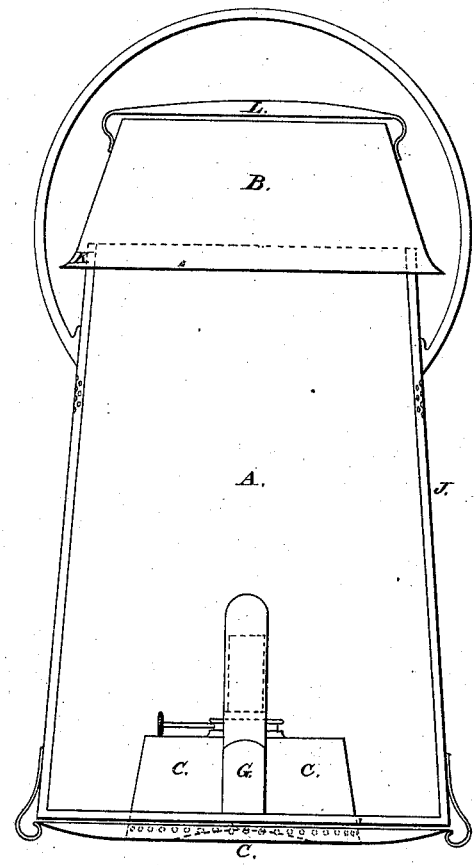
Figure 3:
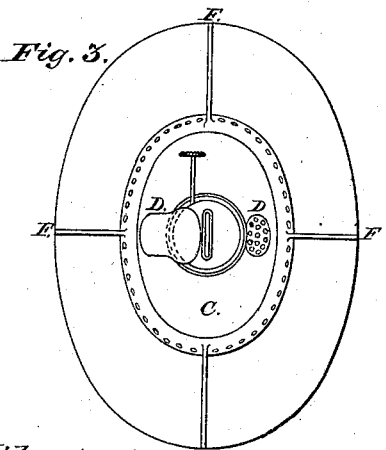
Figure 4:
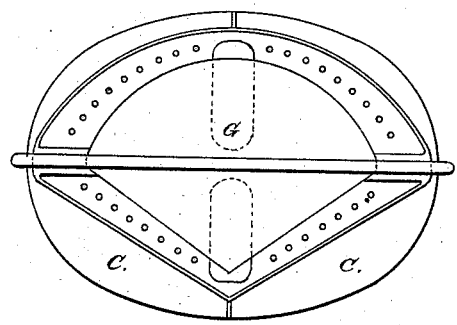

In the drawings, Figure 1 represents a vertical section of my improved lantern; Fig. 2, an elevation of my lantern, with one side removed; Fig. 3, a view showing the lamp partly in plan and partly in horizontal section; and Fig. 4, a horizontal section, showing the lower edge of the lamp-shell, and a modified form thereof.

In the drawing, the letter C represents the lamp-shell, constructed with a double bottom, the lower or real bottom thereof forming also a portion of the real bottom of the lantern. From the false bottom of said lamp extend the tubes H, passing through the body of the lamp and terminating at the top thereof. The letter D represents a detachable tubular deflector, the lower ends of which are adapted to set in the tubes H and be supported thereby, the upper portion being bent, and extending over the burner, terminating on each side of the same, as shown in the drawings. The effect of said tubular deflector is to conduct the air necessary to support combustion up through the body of the oil in the lamp, producing a stronger current and a more brilliant light, and also keeping the oil cool and lessening the liability of explosion. The outer or real bottom of the lamp is of concavo-convex form, and is supplied with perforations, to admit air between the false and real bottom, and the walls of the lamp-shell between the false and real bottom, as also the portion of the false bottom to which the tubes H are attached, are perforated—the first to admit air to the space between the real and false bottom of the lantern, and the second to admit air to the tubes H and tubular deflector D.

From the space between the real and false bottoms of the lantern extends a tubular deflector, G, up over the deflector D, and false bottom of the lantern is perforated at various points to admit air to said deflector G, and to the lantern outside of the lamp-shell C. Said space is provided with any suitable number of partitions, F, Fig. 3, by which it is divided into a number of smaller spaces, the purpose of which is to conduct horizontal currents of air, striking at any quarter of the lantern, through the perforations in the lower part of the lamp C, to supply the deflectors D and G and the body of the lamp through the perforations above described.

The cap or top of the lantern consists of a band, B, of suitable material, in shape approaching a frustum of a cone, the lower edge extending outwardly, as shown. Said band is attached to the frame J in any convenient manner, so as to leave an annular air-space, K, between said band and the upper edge of the lantern. The band B is surmounted with a cover, L, extending outside of its upper edge, and so attached as to leave an air-space between the two.

The space between the band and its cap is for the escape of the products of combustion, and the space K for the purpose of admitting a current of air to the lamp, especially when a downward movement, for any reason, is given to the lantern, in order to increase the draft and keep the upper part of the lantern cool. The concave lower side of the false bottom of the lamp also assists in increasing the current into the lantern at any sudden depression of the same, and the concave upper side of the false bottom of the lantern acts in a similar manner, to force the air into the body of the lantern at any upward movement of the same, thus preventing the smoking experienced in ordinary lanterns by rapidly shifting the position of the same.

The detachable tubular deflector G is not essential to the perfect operation of my improved lamp, and may therefore be omitted if desired.

What I claim, and desire to secure by Letters Patent, is—

1. The combination, in a lantern, of the lamp, the perforated bottom, the tubes H, extending up from said bottom, and the detachable tubular deflector D, having its lower end communicating with the upper ends of the tubes, substantially as and for the purpose described.

2. The combination, with a lantern, its lamp, the tubular deflector D, and tubes H, communicating at their upper ends with the deflector, of the double perforated bottom, substantially as and for the purpose described.

3. In combination with the double bottom of the lantern, a series of partitions forming horizontal air-spaces, whereby horizontal currents of air are admitted from any quarter of the lamp, substantially as and for the purposes set forth.

4. In combination with a lamp, a perforated concavo-convex bottom, whereby air is deflected into the same when the lamp is suddenly lowered, substantially as set forth.

5. The tubular deflector, in combination with the double bottoms of the lamp and lantern, whereby the air is uniformly supplied to the burner, substantially as specified.

6. The combination of the lamp and tubular deflector, the concavo-convex bottom, and the air-spaces therein, with the band and cap with air-spaces for the admission and escape of air, the whole arranged to operate as herein described, to increase the supply of air to the lantern when shifted vertically, substantially as herein set forth.

E. B. REQUA.

Witnesses:
WM. B. CARPENTER,
EDWD. E. WATERS.